J. HAHN.
VEHICLE BRAKE-LOCKS.

No. 194,348. Patented Aug. 21, 1877.

WITNESSES:
C. Neveux
J. H. Scarborough

INVENTOR:
J. Hahn
BY Munn & Co
ATTORNEYS.

UNITED STATES PATENT OFFICE.

JOHN HAHN, OF SPADES, INDIANA.

IMPROVEMENT IN VEHICLE-BRAKE LOCKS.

Specification forming part of Letters Patent No. 194,348, dated August 21, 1877; application filed June 30, 1877.

*To all whom it may concern:*

Figure 1:
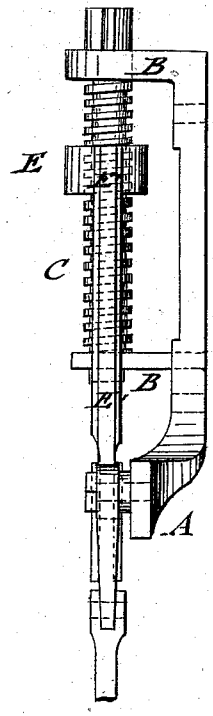
Figure 2:
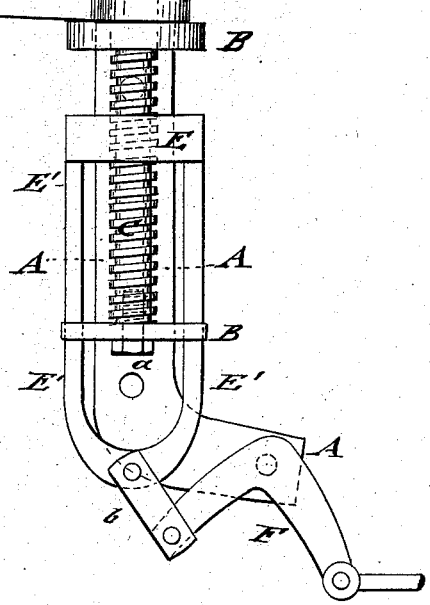

Be it known that I, JOHN HAHN, of Spades, in the county of Ripley and State of Indiana, have invented a new and Improved Brake-Lock, of which the following is a specification:

In the accompanying drawing, Figure 1 represents a side elevation, and Fig. 2 a front view, of my improved brake-lock.

Similar letters of reference indicate corresponding parts.

The invention relates to an improved brake operating and locking device, which may be applied to any vehicle or railroad-car; and it consists of a revolving screw-shaft with hand-crank, operating a traversing nut and slide-frame, and thereby the lever-connections.

In the drawing, A represents the supporting main frame, which is bolted to the inside or outside of a wagon, carriage, omnibus, street or other car, and which carries, in fixed supports B, a screw-shaft, C, that is revolved by a hand-crank, D.

The screw-shaft C revolves axially, but is prevented from changing its position longitudinally in the supports B by the crank at one end and a fastening screw-nut, $a$, at the other end of the screw-shaft.

A screw-nut, E, at the end of a sliding frame, E', traverses along the screw-shaft C by the revolutions of the same, being moved thereby either up or down, according to the direction of motion of the hand-crank. The U-shaped frame E' is guided in side recesses of the lower support B, and connected by a pivot-link, $b$, with a fulcrumed elbow-lever, F, that is pivoted again by its other arm to a forked rod connecting with the brake device.

By turning the crank in one direction the nut is drawn up and the brake applied. By turning in opposite direction the nut is moved down and the brake released.

The device is easily operated, and has the advantage of applying the brake in uniform and more or less powerful manner, and locking the same thereon as long as required, forming thus a reliable brake-operating device for vehicles.

I am aware that a vertical screw-shaft and a sliding nut have been heretofore used with links and levers to operate a car-brake; but

What I claim is—

The U-shaped sliding frame E', connected by nut at upper end with screw-shaft of frame A, and at lower end with the brake mechanism, as and for the purpose specified.

JOHN HAHN.

Witnesses:
 CASPER SITSMAN,
 JACOB BAULK.